US009046752B2

(12) United States Patent
Asakawa

(10) Patent No.: US 9,046,752 B2
(45) Date of Patent: Jun. 2, 2015

(54) PROJECTOR HAVING BLUE LIGHT ALLEVIATING PART

(71) Applicant: Katsumi Asakawa, Tokyo (JP)

(72) Inventor: Katsumi Asakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 231 days.

(21) Appl. No.: 13/683,740

(22) Filed: Nov. 21, 2012

(65) Prior Publication Data

US 2013/0265498 A1 Oct. 10, 2013

(30) Foreign Application Priority Data

Apr. 5, 2012 (JP) ................. 2012-086158

(51) Int. Cl.
| | |
|---|---|
| *G03B 21/20* | (2006.01) |
| *H04N 9/31* | (2006.01) |
| *H04N 9/64* | (2006.01) |
| *H04N 9/68* | (2006.01) |
| *H04N 9/793* | (2006.01) |
| *G09G 3/34* | (2006.01) |

(52) U.S. Cl.
CPC ........ *G03B 21/2053* (2013.01); *G03B 21/2086* (2013.01); *H04N 9/3158* (2013.01); *H04N 9/3155* (2013.01); *H04N 9/3182* (2013.01); *H04N 9/643* (2013.01); *H04N 9/68* (2013.01); *H04N 9/7933* (2013.01); *G09G 3/3413* (2013.01); *H04N 9/3194* (2013.01)

(58) Field of Classification Search
CPC .............. G03B 21/20; G03B 21/2053; G03B 21/2086; H04N 9/31; H04N 9/3155; H04N 9/3158; H04N 9/3191; H04N 9/3194; H04N 9/64; H04N 9/643; H04N 9/68; H04N 9/793; H04N 9/7933; H04N 9/3182; G09G 3/3406; G09G 3/3413; G09G 5/02; G09G 5/10
USPC ........ 353/31, 85, 94, 122; 348/649, 651, 818; 345/589, 690
See application file for complete search history.

(56) References Cited

U.S. PATENT DOCUMENTS

| | | | | |
|---|---|---|---|---|
| 5,406,305 | A * | 4/1995 | Shimomura et al. | 345/102 |
| 6,075,525 | A * | 6/2000 | Hsieh | 345/589 |
| 6,078,309 | A * | 6/2000 | Chen et al. | 345/589 |
| 7,270,425 | B2 * | 9/2007 | Arai et al. | 353/87 |
| 7,403,227 | B2 * | 7/2008 | Schinner | 348/333.01 |
| 7,646,154 | B2 * | 1/2010 | Kang et al. | 315/312 |
| 2006/0152525 | A1 * | 7/2006 | Woog | 345/589 |
| 2007/0018102 | A1 * | 1/2007 | Braune et al. | 250/336.1 |
| 2008/0186711 | A1 * | 8/2008 | Sanchez Ramos | 362/293 |

FOREIGN PATENT DOCUMENTS

| | | |
|---|---|---|
| JP | 2006-330447 A | 12/2006 |
| JP | 2008-311532 A | 12/2008 |

* cited by examiner

*Primary Examiner* — Jori S Reilly-Diakun
(74) *Attorney, Agent, or Firm* — Birch, Stewart, Kolasch & Birch, LLP

(57) ABSTRACT

A projector includes a light modulation part modulating light generated by a light source part, a video signal processing part processing a video signal to be input, and a projection optical system projecting the light modulated by the light modulation part onto an external projection target to obtain a projected video image. The video signal processing part includes a blue light effect alleviating part alleviating effects of blue light on retinas. In a case where only a ratio of a blue signal included in the video signal is high, the blue light effect alleviating part performs control to reduce the brightness of the projected video image as a whole by reducing signal values of the blue signal, a green signal, and a red signal.

26 Claims, 7 Drawing Sheets

F I G . 3
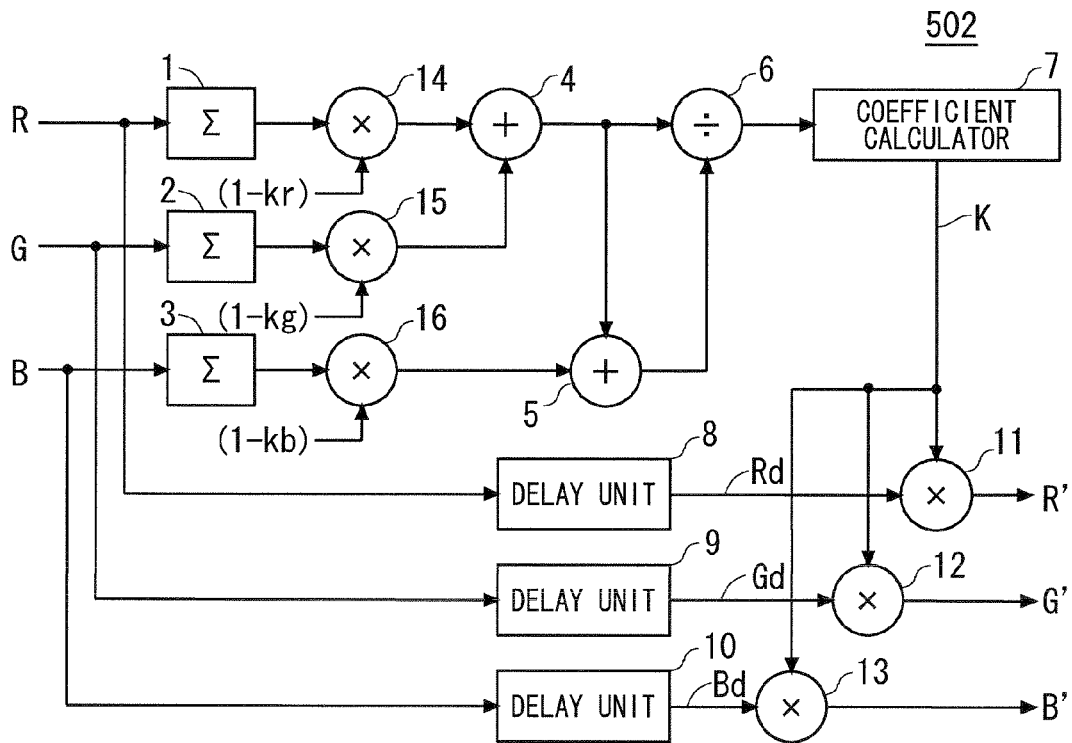
F I G . 4
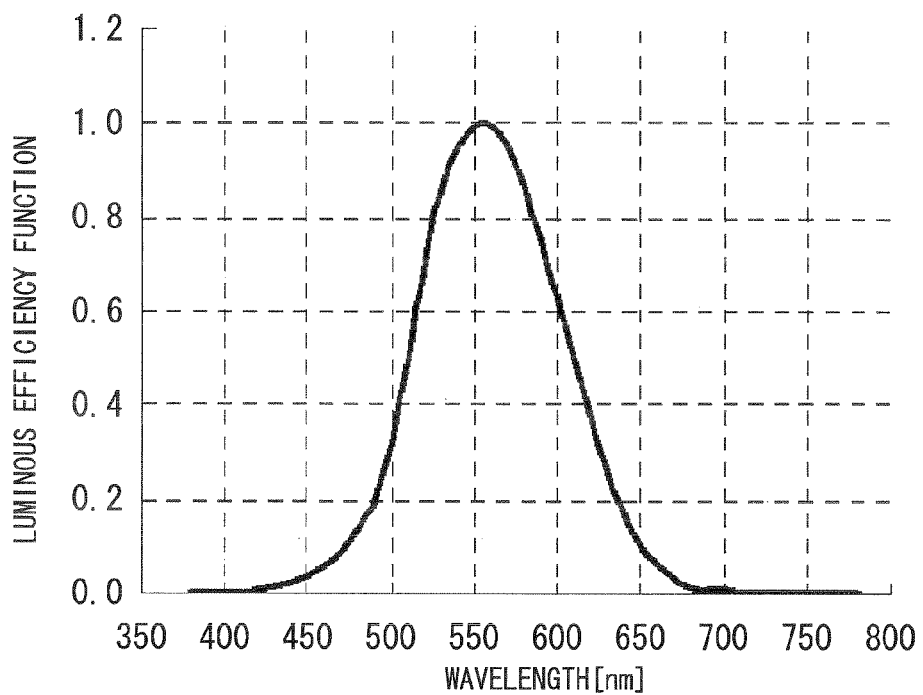

| (1, 1) | (2, 1) | (3, 1) | (4, 1) |
| --- | --- | --- | --- |
| (1, 2) | (2, 2) | (3, 2) ● BR | (4, 2) |
| (1, 3) | (2, 3) | (3, 3) | (4, 3) |
| (1, 4) | (2, 4) | (3, 4) | (4, 4) |

F I G. 1 0
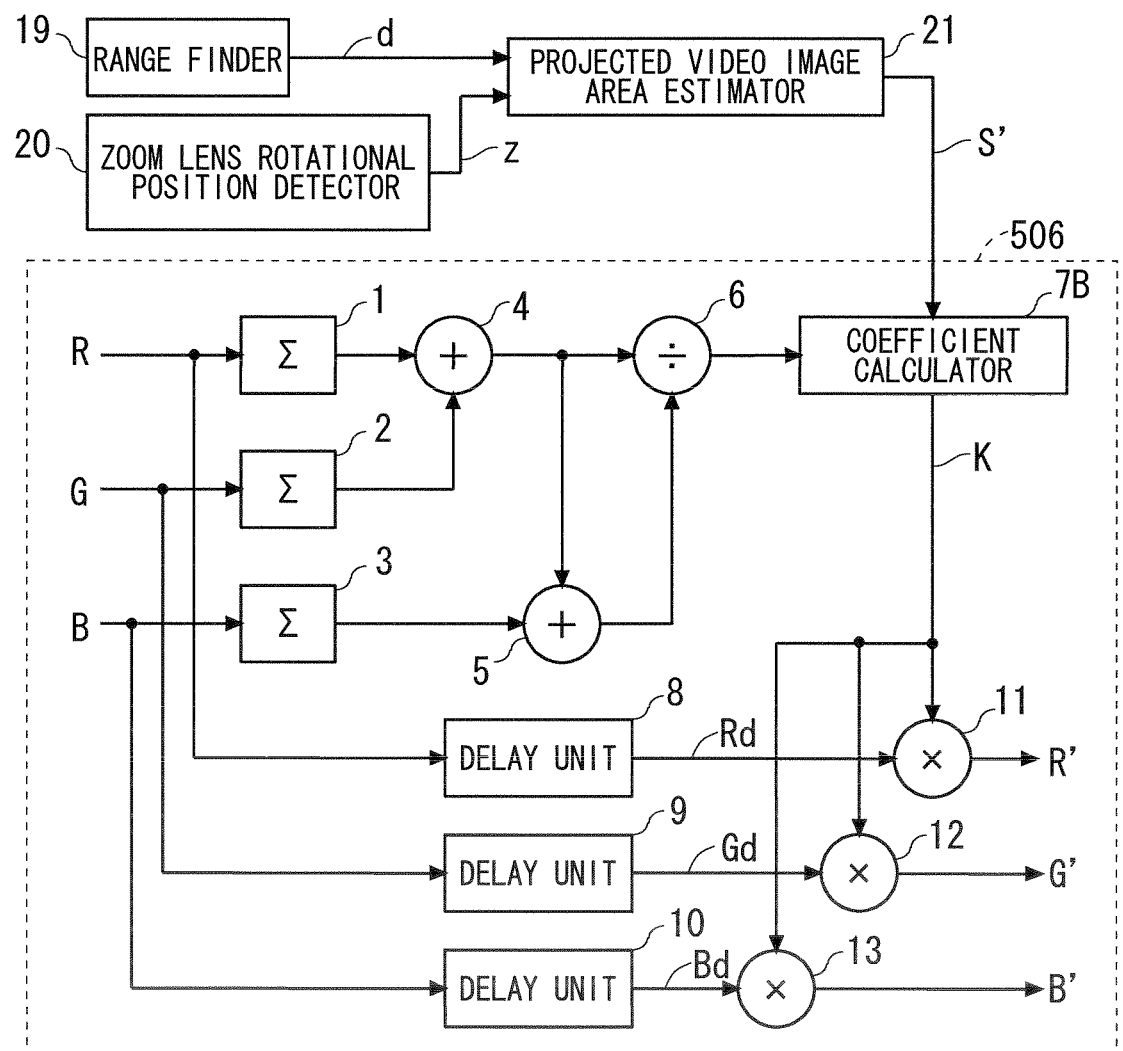

F I G . 1 1
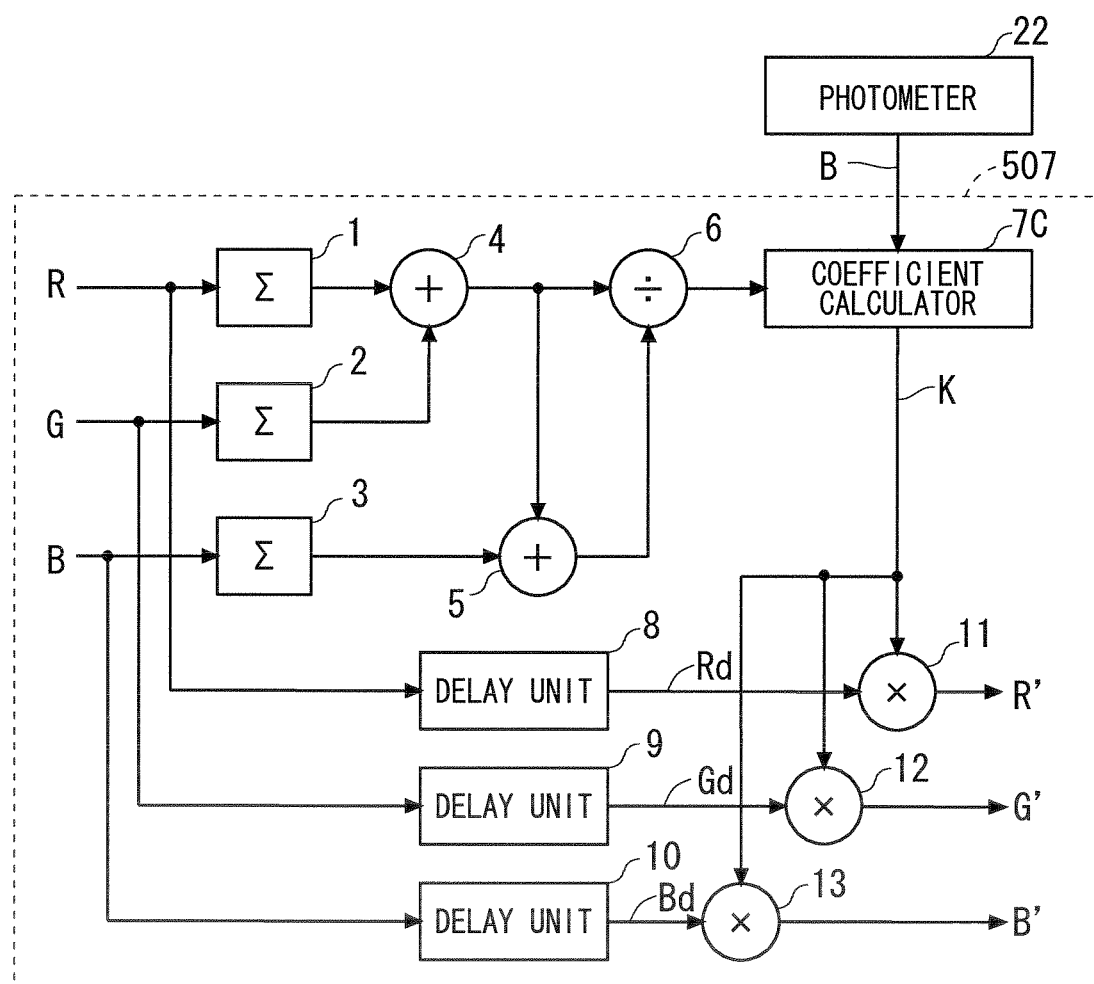

PROJECTOR HAVING BLUE LIGHT ALLEVIATING PART

BACKGROUND OF THE INVENTION

1. Field of the Invention

The present invention relates to a projector, and more particularly, to a projector capable of protecting retinas from projection light.

2. Description of the Background Art

In a projector, light of three primary colors, i.e., red light, green light, and blue light, are normally used as a light source for achieving color display. A cathode-ray tube (CRT), a halogen lamp, a xenon lamp, a metal halide lamp, an extra-high pressure mercury lamp, and the like have been used as the light source thereof. Recently, along with growing awareness of energy conservation, projectors using light emitting diodes (LEDs) and laser capable of reducing power consumption as a light source have also appeared on the market.

As to the above-mentioned projector, attention should be paid to effects of blue light on retinas. It is known that in a case where retinas are exposed to the light having a wavelength of mainly 400 nm to 500 nm, molecules in cells are excited by light and cause a chemical reaction, and accordingly, retinal tissues are affected. Also in JIS C 7550 "Photobiological safety of lamps and lamp systems" (2011) of the Japan Industrial Standards, exposure to blue light is limited by, for example, providing an allowed exposure time for blue light to prevent retinas from being affected by blue light.

For example, a blue LED known as a light source of a display device has spectral characteristics in a wavelength range that affects retinas, and blue light does not appear bright for human eyes, and thus, the properties thereof that pupils close partially and a defense reaction by blinking does not work effectively are pointed out.

Projectors in which blue LEDs are used as a light source have already been developed. Further, in recent years, projectors in which blue laser having higher directivity and coherence than LEDs is used as a light source are being developed, which leads to an increasing possibility that retinas of a user may be affected by blue light.

Japanese Patent Application Laid-Open No. 2008-311532 discloses the technology of obtaining a white light emitting device that removes the light in a wavelength range that may have effects on retinas to lessen such effects.

Japanese Patent Application Laid-Open No. 2006-330447 discloses a projector having a retina projection mode in which control is made so as to limit an emission amount of projection light for reducing a possibility that retinas of a person who intentionally or unintentionally looks into an optical system part such as a projection lens may be affected.

It is possible to reduce a possibility that retinas may be affected with the use of a light source, from which the light in the wavelength range that may cause blue light to affect retinas is removed with an optical filter, as disclosed in Japanese Patent Application Laid-Open No. 2008-311532, but image quality inevitably degrades, for example, color reproduction range of a projected image becomes narrow.

In the retina protection mode as disclosed in Japanese Patent Application Laid-Open No. 2006-330447, the protection can be taken against a case where a person looks into projection light, but protection cannot be taken against a case where a person views a video image projected onto a screen for a long period of time.

SUMMARY OF THE INVENTION

The present invention has an object to provide a projector in which a possibility that retinas of a user may be affected is reduced without incurring degradation of image quality, such as narrowed color reproduction range of a projected video image.

A projector according to the present invention includes a light modulation part modulating light generated by a light source part, a video signal processing part processing a video signal to be input, and a projection optical system projecting the light modulated by the light modulation part onto an external projection target to obtain a projected video image. The video signal processing part includes a blue light effect alleviating part alleviating effects of blue light on retinas. In a case where only a ratio of a blue signal included in the video signal is high, the blue light effect alleviating part performs control to reduce the brightness of the projected video image as a whole by reducing signal values of the blue signal, a green signal, and a red signal.

According to the projector, in a case where only a ratio of a blue signal included in a video signal is high, control is performed to reduce the brightness of the projected video image as a whole by reducing the signal values of the blue signal, green signal, and red signal. This enables to protect retinas of a user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing the configuration of each of blue light effect alleviating parts of the projectors according to the second and fourth preferred embodiments of the present invention and the blue light effect alleviating parts of the projectors according to the fifth, sixth, and seventh preferred embodiments of the present invention;

FIG. 4 shows a relative luminous efficiency curve of photopic vision that is determined by the International Commission on Illumination;

FIG. 10 is a block diagram showing the configuration of a blue light effect alleviating part of the projector according to the tenth preferred embodiment of the present invention; and FIG. 11 is a block diagram showing the configuration of a blue light effect alleviating part of the projector according to the eleventh preferred embodiment of the present invention.

PREFERRED EMBODIMENTS FOR CARRYING OUT THE INVENTION

<As to Projector>

Projectors that receive video signals from a device that outputs video signals, for example, from a personal computer or video equipment such as a DVD recorder and project video images thereof onto a screen are classified into the following two types each having a typical configuration.

One type is configured to create projected video images by causing light from a light source such as a lamp to pass through a display device such as a transmissive liquid crystal panel that forms a video pattern based on video signals, or create projected video images with the use of a reflective liquid crystal panel that reflects the light corresponding to a video pattern.

As an example of the above-mentioned configuration, with the use of three reflective liquid crystal panels, video patterns corresponding to red light, green light, and blue light, which correspond to three primary colors of light, are respectively formed in the liquid crystal panels, and the red light, green light, and blue light respectively corresponding to the liquid crystal panels are input, to thereby obtain video images of three primary colors. Then, the video images of three primary colors are combined with an optical component such as a mirror, and the combined video images are output as one color video image from a projection optical system.

The other type is configured to create projected video images by causing the light from a light source such as a lamp to be reflected on a reflective display device that forms video patterns corresponding to red, green, and blue in a time division manner.

As an example the above-mentioned configuration, video patterns corresponding to red, green, and blue are formed in a time division manner by a display device referred to as DMD (registered trademark) in which a plurality of movable micromirrors each corresponding to one pixel are arranged in a plane, and the light from a light source is input through a color filter that creates red light, green light, and blue light in accordance with video patterns of respective colors and is caused to be reflected, whereby video images of three primary colors are obtained in a time division manner. Then, the obtained video images are successively output via a projection optical system, to thereby obtain one color video image owing to time integral effects. Note that DMD is an abbreviation of digital micromirror device.

A projector according to the present invention is applicable as any of the above-mentioned two types of projectors. Hereinbelow, preferred embodiments regarding the projector according to the present invention are described.

Figure 1:
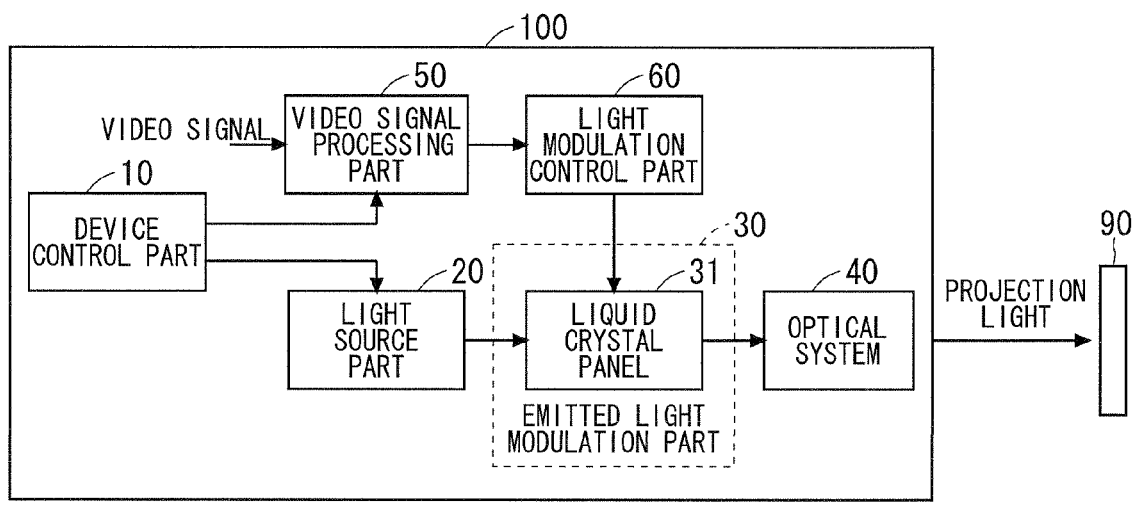
FIG. 1 is a block diagram showing the schematic configuration of each of projectors according to preferred embodiments of the present invention.

FIG. 1 is a block diagram showing the schematic configuration of the projector according to the present invention. As shown in FIG. 1, a projector 100 mainly includes a device control part 10, a light source part 20, an emitted light modulation part 30, a projection optical system 40, a video signal processing part 50, and a light modulation control part 60, and projects images onto a screen 90 placed outside of the projector 100 by the projection light emitted from the projection optical system 40.

The device control part 10 is configured as, for example, a microprocessor such as a central processing unit (CPU), and controls parts of the projector 100.

The light source part 20 includes a light source lamp (not shown) and the like and generates projection light. The emitted light modulation part 30 modulates the projection light generated by the light source part 20, which is described as the part that modulates projection light using a reflective liquid crystal panel 31 described below in the present application.

The projection optical system 40 projects the projection light modulated by the emitted light modulation part 30, and is configured of optical components including a projection lens for forming an image of the emitted light on the screen 90.

The projection light emitted from the light source part 20 is modulated by the emitted light modulation part 30, and then, is enlarged by the projection optical system 40 to be projected onto the screen 90.

The video signal processing part 50 receives video signals from a personal computer or video equipment such as a DVD recorder, and converts the video signals into signals for reproducing the video signals as images for light modulation by the liquid crystal panel 31.

The light modulation control part 60 generates signals for driving pixels of the liquid crystal panel 31 based on the video signals from the video signal processing part 50, and outputs the generated signals to the liquid crystal panel 31, to thereby control a light modulation process in the liquid crystal panel 31.

While the liquid crystal panel 31 may be a transmissive type or a reflective type, in a case of using a reflective liquid crystal panel, the emitted light modulation part 30 includes optical elements such as a deflection beam splitter for emission of reflection light from crystal liquid.

The parts regarding the process for video signals in the video signal processing part 50 of the projector 100 are parts according to the present invention. Hereinbelow, preferred embodiments according to the present invention are described.

<First Preferred Embodiment>

Figure 2:
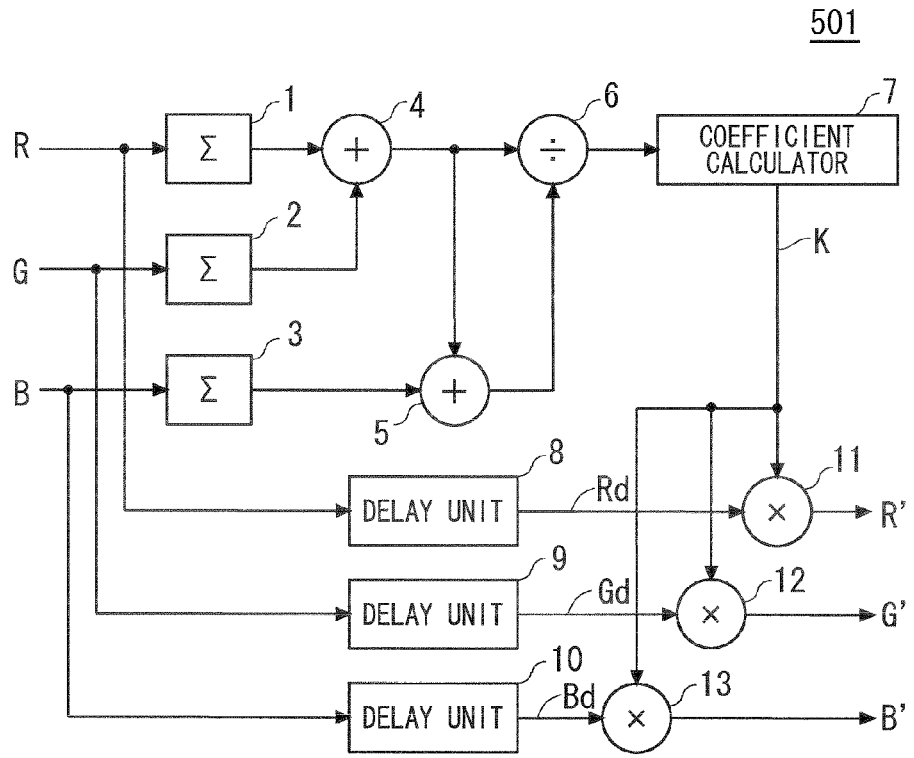
FIG. 2 is a block diagram showing the configuration of each of blue light effect alleviating parts of the projectors according to the first, fifth, sixth, and seventh preferred embodiments of the present invention.

FIG. 2 is a block diagram showing the configuration of a blue light effect alleviating part 501 of a projector according to the first preferred embodiment of the present invention. Note that the blue light effect alleviating part 501 is included in the video signal processing part 50 shown in FIG. 1.

As shown in FIG. 2, the blue light effect alleviating part 501 mainly includes sum calculators 1, 2, and 3, adders 4 and 5, a divider 6, a coefficient calculator 7, delay units 8, 9, and 10, and multipliers 11, 12, and 13.

The blue light effect alleviating part 501 converts a red signal R, a green signal G, and a blue signal B before being input to a display device into a processed red signal R', a processed green signal G', and a processed blue signal B' in which effects of blue light on retinas are alleviated. The conversion method is described with reference to FIG. 2.

The sum calculators 1 to 3 receive the red signal R, the green signal G, and the blue signal B, and calculate a red signal sum $\Sigma R$, a green signal sum $\Sigma G$, and a blue signal sum $\Sigma B$ in all pixels (all pixels of the liquid crystal panel 31) of video signals for one frame, respectively.

The adder 4 receives the red signal sum $\Sigma R$ and the green signal sum $\Sigma G$ and calculates a first addition value ($\Sigma R + \Sigma G$).

The adder 5 receives the blue signal sum $\Sigma B$ and the first addition value ($\Sigma R + \Sigma G$) and calculates a second addition value ($\Sigma R + \Sigma G + \Sigma B$). The second addition value ($\Sigma R + \Sigma G + \Sigma B$) represents a sum of video signals for one frame.

The divider 6 receives the first addition value ($\Sigma R + \Sigma G$) and the second addition value ($\Sigma R + \Sigma G + \Sigma B$) and calculates a division value $\{(\Sigma R+\Sigma G)/(\Sigma R+\Sigma G+\Sigma B)\}$ obtained by dividing the first addition value $(\Sigma R+\Sigma G)$ by the second addition value $(\Sigma R+\Sigma G+\Sigma B)$.

The coefficient calculator 7 receives the division value $\{(\Sigma R+\Sigma G)/(\Sigma R+\Sigma G+\Sigma B)\}$ and compares it with a specified value C. Here, the specified value C is a numerical value exceeding zero and less than one, and serves as an index value for judging whether or not only blue light (blue signals) is included at a high ratio in video images (video signals) for one frame.

In a case where Expression (1) below is satisfied, that is, in a case where the ratio of the blue signal sum $\Sigma B$ to the sum $(\Sigma R+\Sigma G+\Sigma B)$ of video signals for one frame is equal to or larger than the specified value C, the coefficient calculator 7 outputs a numerical value K1 as a coefficient K.

$$(\Sigma R+\Sigma G)/(\Sigma R+\Sigma G+\Sigma B)<C \quad (1)$$

In a case where Expression (2) below is satisfied, that is, in a case where the ratio of the blue signal sum $\Sigma B$ to the sum $(\Sigma R+\Sigma G+\Sigma B)$ of video signals for one frame is smaller than the specified value C, the coefficient calculator 7 outputs a numerical value K2 as the coefficient K.

$$(\Sigma R+\Sigma G)/(\Sigma R+\Sigma G+\Sigma B)\geq C \quad (2)$$

Here, in a case where the coefficient K1 is a numerical value smaller than one, for example, 0.9 and the coefficient K2 is one, if the red signal, the green signal, and the blue signal are each multiplied by the coefficient K1, numerical values of the red signal, the green signal, and the blue signal decrease in proportion to the coefficient K1. On the other hand, in a case where those are each multiplied by the coefficient K2, the red signal, the green signal, and the blue signal do not change.

Accordingly, in a case where video images for one frame have only a high ratio of blue light, that is, in a case where Expression (1) is satisfied, the coefficient K1 is obtained from the coefficient calculator 7, which enables to reduce the brightness of a projected video image as a whole by multiplying each of the red signal, the green signal, and the blue signal by the coefficient K1.

It is required to calculate the sum $(\Sigma R+\Sigma G+\Sigma B)$ of video signals for one frame for obtaining the coefficient K by the coefficient calculator 7, and accordingly, a video signal which is multiplied by the coefficient K is also delayed by a period for one frame using the delay units 8 to 10.

For that purpose, the red signal R, the green signal G, and the blue signal B are input to the delay units 8, 9, and 10, respectively, to thereby obtain a red delay signal Rd, a green delay signal Gd, and a blue delay signal Bd delayed by a period for one frame.

The obtained red delay signal Rd, green delay signal Gd, and blue delay signal Bd are input to the multipliers 11, 12, and 13, respectively, and are multiplied by the coefficient K output from the coefficient calculator 7, whereby the processed red signal R', the processed green signal G', and the processed blue signal B' expressed by Expression (3), (4), and (5) below, respectively, are obtained.

$$R'=Rd\times K \quad (3)$$

$$G'=Gd\times K \quad (4)$$

$$B'=Bd\times K \quad (5)$$

The coefficient K is expressed by Expression (6) below.

$$K=K1 (\text{or } K2) \quad (6)$$

In a case where only the ratio of blue light is high in a projected video image, pupils partially close or a defense reaction by blinking does not work effectively because the blue does not appear bright for human eyes. Therefore, retinas of a user may be affected if the user directly views the projection light that has only a high ratio of the light having a wavelength of 400 nm to 500 nm, views reflected light by secular reflection, or views projected video images on a screen having high reflectance for a long period of time.

Particularly in a case of a projector in which blue laser is included as a light source, retinas of a user are highly likely to be affected due to high directivity and coherence of a laser beam.

However, according to the above-mentioned projector of the first preferred embodiment, in a case where only the ratio of blue light is high in a video signal, retinas of a user can be protected by performing control to reduce the brightness of a projected video image as a whole.

<Second Preferred Embodiment>

FIG. 3 is a block diagram showing the configuration of a blue light effect alleviating part 502 of a projector according to a second preferred embodiment of the present invention, where like reference numerals denote similar elements to those of the blue light effect alleviating part 501 shown in FIG. 2, and overlapping description is not given here. The blue light effect alleviating part 502 is included in the video signal processing part 50 shown in FIG. 1.

As shown in FIG. 3, the blue light effect alleviating part 502 mainly includes the sum calculators 1, 2, and 3, the adders 4 and 5, the divider 6, the coefficient calculator 7, the delay units 8, 9, and 10, the multipliers 11, 12, and 13, and multipliers 14, 15, and 16.

The blue light effect alleviating part 502 converts the red signal R, green signal G, and blue signal B before being input to a display device into the processed red signal R', processed green signal G', and processed blue signal B' in which effects of blue light on retinas are alleviated. The conversion method is described with reference FIG. 3.

The sum calculators 1 to 3 receive the red signal R, the green signal G, and the blue signal B, and calculate the red signal sum $\Sigma R$, the green signal sum $\Sigma G$, and the blue signal sum $\Sigma B$ of video signals for one frame, respectively.

The multipliers 14, 15, and 16 receive the red signal sum $\Sigma R$, green signal sum $\Sigma G$, and blue signal sum $\Sigma B$ of video signals for one frame that are output from the sum calculators 1 to 3, respectively, and then multiply those by coefficients $(1-kr)$, $(1-kg)$, and $(1-kb)$, respectively.

The adder 4 receives a value obtained by multiplying the red signal sum $\Sigma R$ by the coefficient $(1-kr)$ and a value obtained by multiplying the green signal sum $\Sigma G$ by the coefficient $(1-kg)$, and calculates a first addition value $\{(1-kr)\Sigma R+(1-kg)\Sigma G\}$.

Here, kr, kg, and kb are relative luminous efficiencies corresponding to the red light, green light, and blue light of the light source, respectively. The relative luminous efficiency shows the extent and the light wavelength to which human eyes are sensitive, where the brightness of the light that is perceived to be the brightest is represented as one.

The relative luminous efficiencies are classified into the photopic relative luminous efficiency and scotopic relative luminous efficiency regulated by the International Commission on Illumination (CIE). In the present invention, the photopic relative luminous efficiency is used in the nature of a projector.

FIG. 4 shows the luminous efficiency curve determined by the International Commision on Illumination (CIE). In FIG. 4, a horizontal line and a vertical line represent a wavelength (nm) and a relative luminous efficiency, respectively. With reference to FIG. 4, the light having a wavelength of 555 nm appears brightest for human eyes in photopic vision (in the state of light adaptation), and a relative luminous efficiency thereof is taken as one. For example, in a case where a light source is formed of red laser, green laser, and blue laser having oscillation wavelengths of 650 nm, 555 nm, and 450 nm, respectively, the relative luminous efficiencies are 0.1, 1.0, and 0.038, respectively.

The light having a wavelength of 400 nm to 500 nm, which is considered to affect retinas, has a low relative luminous efficiency and is unlikely to appear bright to human eyes, and accordingly, the retinas are likely to be affected because the pupils partially close.

Therefore, the light having a wavelength that does not appear as bright as blue light but is likely to affect retinas can be weighted by multiplication using (1−relative luminous efficiency) as a coefficient for respective colors of a video signal. That is, a signal of light having a wavelength with a smaller relative luminous efficiency results in a larger sum, and results in a particularly high ratio to a video signal.

Now, the description returns to FIG. 3. The adder 5 receives the blue signal sum $\Sigma B$ multiplied by the coefficient (1−kb) and the first addition value $\{(1-kr)\Sigma R+(1-kg)\Sigma G\}$, and calculates a second addition value $\{(1-kr)\Sigma R+(1-kg)\Sigma G+(1-kb)\Sigma B\}$. The second addition value $\{(1-kr)\Sigma R+(1-kg)\Sigma G+(1-kb)\Sigma B\}$ represents a sum of video signals for one frame.

The divider 6 receives the first addition value $\{(1-kr)\Sigma R+(1-kg)\Sigma G\}$ and the second addition value $\{(1-kr)\Sigma R+(1-kg)\Sigma G+(1-kb)\Sigma B\}$, and calculates a division value $[\{(1-kr)\Sigma R+(1-kg)\Sigma G\}/\{(1-kr)\Sigma R+(1-kg)\Sigma G+(1-kb)\Sigma B\}]$ obtained by dividing the first addition value $\{(1-kr)\Sigma R+(1-kg)\Sigma G\}$ by the second addition value $\{(1-kr)\Sigma R+(1-kg)\Sigma G+(1-kb)\Sigma B\}$.

The coefficient calculator 7 receives the division value $[\{(1-kr)\Sigma R+(1-kg)\Sigma G\}/\{(1-kr)\Sigma R+(1-kg)\Sigma G+(1-kb)\Sigma B\}]$, and compares it with a specified value C. Here, the specified value C is a numerical value exceeding zero and less than one and serves as an index value for judging whether or not only the blue light is included at a high ratio in video images for one frame. Note that the specified value C may be a value different from the specified value C in the first preferred embodiment.

In a case where Expression (7) below is satisfied, that is, in a case where the ratio of the blue signal sum $\Sigma B$, which is obtained by multiplication by the coefficient (1−kb), to the sum $\{(1-kr)\Sigma R+(1-kg)\Sigma G+(1-kb)\Sigma B\}$ of video signals for one frame is equal to or larger than the specified value C, the coefficient calculator 7 outputs a numerical value K1 as a coefficient K.

$$\{(1-kr)\Sigma R+(1-kg)\Sigma G\}/\{(1-kr)\Sigma R+(1-kg)\Sigma G+(1-kb)\Sigma B\} < C \qquad (7)$$

In a case where Expression (8) below is satisfied, that is, in a case where the ratio of the blue signal sum $\Sigma B$, which is obtained by multiplication by the coefficient (1−kb), to the sum $\{(1-kr)\Sigma R+(1-kg)\Sigma G+(1-kb)\Sigma B\}$ of video signals for one frame is smaller than the specified value C, the coefficient calculator 7 outputs a numerical value K2 as the coefficient K.

$$\{(1-kr)\Sigma R+(1-kg)\Sigma G\}/\{(1-kr)\Sigma R+(1-kg)\Sigma G+(1-kb)\Sigma B\} \geq C \qquad (8)$$

Here, in a case where the coefficient K1 is a numerical value smaller than one, for example, 0.9 and the coefficient K2 is one, if the red signal, the green signal, and the blue signal are each multiplied by the coefficient K1, numerical values of the red signal, the green signal, and the blue signal decrease in proportion to the coefficient K1. On the other hand, in a case where those are each multiplied by the coefficient K2, the red signal, the green signal, and the blue signal do not change.

Accordingly, in a case where video images for one frame have only a high ratio of blue light, that is, in a case where Expression (7) is satisfied, the coefficient K1 is obtained from the coefficient calculator 7, which enables to reduce the brightness of a projected video image as a whole by multiplying each of the red signal, the green signal, and the blue signal by the coefficient K1. Therefore, retinas of a user can be protected.

As described above, (1−relative luminous efficiency) is multiplied as a coefficient for respective colors of a video signal, whereby the light having a wavelength that does not appear as bright as blue light but is likely to affect retinas can be weighted, which enables the control in consideration of the sensitivity to brightness.

<Third Preferred Embodiment>

Figure 5:
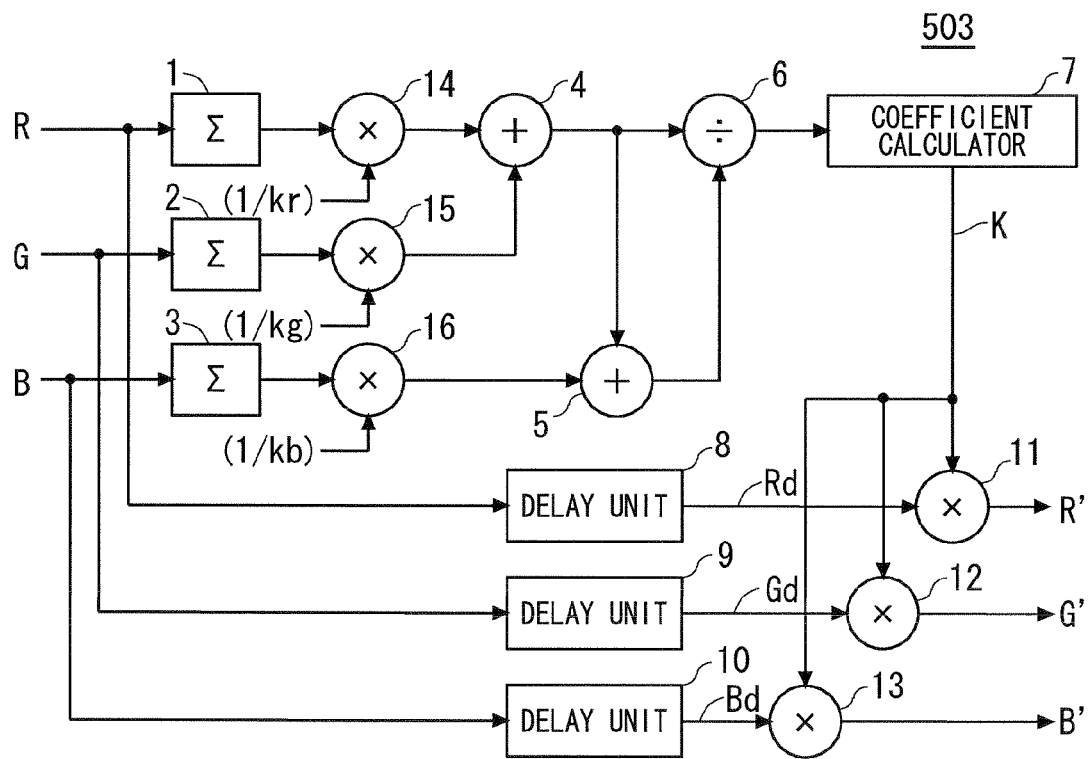
FIG. 5 is a block diagram showing the configuration of each of a blue light effect alleviating part of the projector according to the third preferred embodiment of the present invention and the blue light effect alleviating parts of the projectors according to the fourth, fifth, sixth, and seventh preferred embodiments of the present invention.

FIG. 5 is a block diagram showing the configuration of a blue light effect alleviating part 503 of a projector according to a third preferred embodiment of the present invention, where like reference numerals denote similar elements to those of the blue light effect alleviating part 502 shown in FIG. 3, and overlapping description is not given here. The blue light effect alleviating part 503 is included in the video signal processing part 50 shown in FIG. 1.

As shown in FIG. 5, the blue light effect alleviating part 503 mainly includes the sum calculators 1, 2, and 3, the adders 4 and 5, the divider 6, the coefficient calculator 7, the delay units 8, 9, and 10, and the multipliers 11, 12, 13, 14, 15, and 16.

The blue light effect alleviating part 503 converts the red signal R, green signal G, and blue signal B before being input to a display device into the processed red signal R', processed green signal G', and processed blue signal B' in which effects of blue light on retinas are alleviated. The conversion method is basically identical to the method by the blue light effect alleviating part 502 described with reference to FIG. 3, but coefficients multiplied by the multipliers 14 to 16 are different.

That is, the red signal sum $\Sigma R$, green signal sum $\Sigma G$, and blue signal sum $\Sigma B$ of video signals for one frame, which are output from the sum calculators 1 to 3, respectively, are input to the multipliers 14, 15, and 16, respectively, and are multiplied by coefficients (1/kr), (1/kg), and (1/kb), respectively.

The adder 4 receives a value obtained by multiplying the red signal sum $\Sigma R$ by the coefficient (1/kr) and a value obtained by multiplying the green signal sum $\Sigma G$ by the coefficient (1/kg), and calculates a first addition value $\{(1/kr)\Sigma R+(1/kg)\Sigma G\}$.

Here, kr, kg, and kb are relative luminous efficiencies corresponding to wavelengths of red light, green light, and blue light of a light source, respectively. For each color of a video signal, (1/relative luminous efficiency) is multiplied as a coefficient, and accordingly, the light having a wavelength that does not appear as bright as blue light but is likely to affect retinas can be weighted. That is, a signal of light having a wavelength with a smaller relative luminous efficiency results in a larger sum, and results in a particularly high ratio to a video signal.

Now, the description returns to FIG. 5. The adder 5 receives a value obtained by multiplying the blue signal sum $\Sigma B$ by the coefficient (1/kb) and the first addition value $\{(1/kr)\Sigma R+(1/kg)\Sigma G\}$, and calculates a second addition value $\{(1/kr)\Sigma R+(1/kg)\Sigma G+(1/kb)\Sigma B\}$. The second addition value $\{(1/kr)\Sigma R+(1/kg)\Sigma G+(1/kb)\Sigma B\}$ represents a sum of video signals for one frame.

The divider 6 receives the first addition value $\{(1/kr)\Sigma R+(1/kg)\Sigma G\}$ and the second addition value $\{(1/kr)\Sigma R+(1/kg)\Sigma G+(1/kb)\Sigma B\}$, and calculates a division value $[\{(1/kr)\Sigma R+(1/kg)\Sigma G\}/\{(1/kr)\Sigma R+(1/kg)\Sigma G+(1/kb)\Sigma B\}]$ obtained by dividing the first addition value $\{(1/kr)\Sigma R+(1/kg)\Sigma G\}$ by the second addition value $\{(1/kr)\Sigma R+(1/kg)\Sigma G+(1/kb)\Sigma B\}$.

The coefficient calculator 7 receives the division value $[\{(1/kr)\Sigma R+(1/kg)\Sigma G\}/\{(1/kr)\Sigma R+(1/kg)\Sigma G+(1/kb)\Sigma B\}]$, and compares it with a specified value C. Note that the specified value C may be a value different from the specified values C in the first and second preferred embodiments.

In a case where Expression (9) below is satisfied, that is, in a case where the ratio of the blue signal sum $\Sigma B$, which is obtained by multiplication by the coefficient (1/kb), to the sum $\{(1/kr)\Sigma R+(1/kg)\Sigma G+(1/kb)\Sigma B\}$ of video signals for one frame is equal to or larger than the specified value C, the coefficient calculator 7 outputs a numerical value K1 as a coefficient K.

$$\{(1/kr)\Sigma R+(1/kg)\Sigma G\}/\{(1/kr)\Sigma R+(1/kg)\Sigma G+(1/kb)\Sigma B\} < C \qquad (9)$$

In a case where Expression (10) below is satisfied, that is, in a case where the ratio of the blue signal sum $\Sigma B$, which is obtained by multiplication by the coefficient (1/kb), to the sum $\{(1/kr)\Sigma R+(1/kg)\Sigma G+(1/kb)\Sigma B\}$ of video signals for one frame is smaller than the specified value C, the coefficient calculator 7 outputs a numerical value K2 as the coefficient K.

$$\{(1/kr)\Sigma R+(1/kg)\Sigma G\}/\{(1/kr)\Sigma R+(1/kg)\Sigma G+(1/kb)\Sigma B\} \geq C \qquad (10)$$

Here, in a case where the coefficient K1 is a numerical value smaller than one, for example, 0.9 and the coefficient K2 is one, if the red signal, the green signal, and the blue signal are each multiplied by the coefficient K1, numerical values of the red signal, the green signal, and the blue signal decrease in proportion to the coefficient K1. On the other hand, in a case where those are each multiplied by the coefficient K2, the red signal, the green signal, and the blue signal do not change.

Accordingly, in a case where video images for one frame have only a high ratio of blue light, that is, in a case where Expression (9) is satisfied, the coefficient K1 is obtained from the coefficient calculator 7, which enables to reduce the brightness of a projected video image as a whole by multiplying each of the red signal, the green signal, and the blue signal by the coefficient K1. Therefore, retinas of a user can be protected.

As described above, the reciprocal of relative luminous efficiency (1/relative luminous efficiency) is multiplied as a coefficient for respective colors of a video signal, whereby the light having a wavelength that does not appear as bright as blue light but is likely to affect retinas can be weighted, which enables the control in consideration of the sensitivity to brightness.

<Fourth Preferred Embodiment>

The description has been given in the second and third preferred embodiments on the premise of the projector including the light source having a single wavelength, such as a laser beam. A fourth preferred embodiment according to the present invention is premised on the configuration in which, for example, LEDs that do not have a single wavelength but have a predetermined wavelength width as shown in, for example, FIG. 6 are used as a light source.

Figure 6:
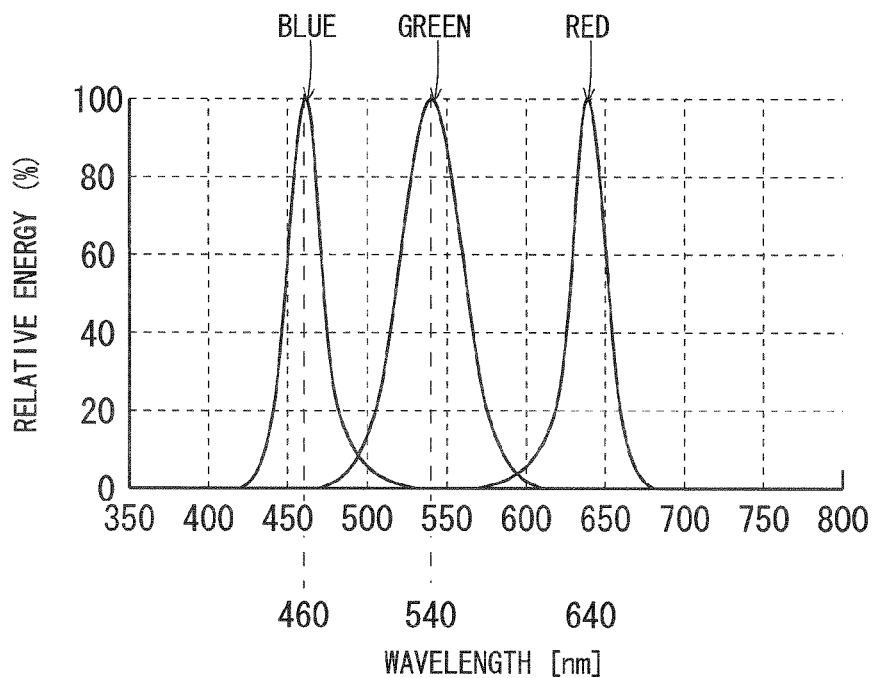
FIG. 6 shows an example of spectral distribution of red, green, and blue in a case where LEDs are used as a light source.

In FIG. 6, a horizontal axis and a vertical axis represent a wavelength (nm) and relative energy (%), respectively. In a light source having a spectral distribution as shown in FIG. 6, the relative energy at each wavelength of the spectral distribution of the light of each color is multiplied by a relative luminous efficiency at each wavelength, and a wavelength having a maximum value is taken as a representative wavelength.

In a case where the spectral distribution of blue LED light in FIG. 6 is 420 nm to 540 nm, the relative energy at 420 nm is multiplied by a relative luminous efficiency at 420 nm. Multiplication is performed similarly up to 540 nm, and the wavelength having the largest multiplication result is taken as a representative wavelength.

In the example of FIG. 6, if 460 nm, 540 nm, and 640 nm are calculated as the representative wavelengths of blue light, green light, and red light, respectively, the relative luminous efficiencies of 460 nm, 540 nm, and 640 nm are used as a relative luminous efficiency kb of blue light, a relative luminous efficiency kg of green light, and a relative luminous efficiency kr of red light, respectively.

In a projector according to the fourth preferred embodiment of the present invention, the blue light effect alleviating part 502 described with reference to FIG. 3 or the blue light effect alleviating part 503 described with reference to FIG. 5 is used as the device configuration, and the relative luminous efficiency kb, relative luminous efficiency kg, and relative luminous efficiency kr are used as relative luminous efficiencies used by the blue light effect alleviating parts 502 and 503.

As described above, the weighting is performed with a relative luminous efficiency of the light having a wavelength that contributes most to brightness among rays of light of colors in a light source, that is, the light having a wavelength with the largest value of relative energy×relative luminous efficiency thereamong, whereby retinas of a user can be protected also in a case where the light that does not have a single wavelength but has a predetermined wavelength width is used as a light source.

<Fifth Preferred Embodiment>

The description has been given in the first to fourth preferred embodiments above assuming that the sum calculators 1 to 3 calculate the red signal sum $\Sigma R$, the green signal sum $\Sigma G$, and the blue signal sum $\Sigma B$ of video signals for one frame as to the red signal R, the green signal G, and the blue signal B, respectively. A projector according to a fifth preferred embodiment is different from those of the first to fourth preferred embodiments in that the sum calculators 1 to 3 calculate a sum of red signals, a sum of green signals, and a sum of blue signals in a plurality of pixels (pixels of the liquid crystal panel 31) that form a certain region obtained in a case where the projected video images for one frame are divided into N pieces.

In the projector according to the fifth preferred embodiment of the present invention, the device configuration may be made to include any of the blue light effect alleviating part 501 described with reference to FIG. 2, the blue light effect alleviating part 502 described with reference to FIG. 3, and the blue light effect alleviating part 503 described with reference to FIG. 5. Hereinbelow, description is given premised on the blue light effect alleviating part 501 described with reference to FIG. 2.

In the projector according to the fifth preferred embodiment, the sum calculators 1 to 3 calculate sums $\Sigma Rp$, $\Sigma Gp$, and $\Sigma Bp$ of the red signals, green signals, and blue signals in a plurality of pixels that form a certain region obtained in a case where projected video images for one frame are divided into N pieces, respectively. Here, a suffix p represents the number of a divided region, which is expressed by an integer from one to N.

The adder 4 receives a red signal sum ΣRp and a green signal sum ΣGp and calculates a first addition value (ΣRp+ΣGp).

The adder 5 receives a blue signal sum ΣBp and the first addition value (ΣRp+ΣGp) and calculates a second addition value (ΣRp+ΣGp+ΣBp). The second addition value (ΣRp+ΣGp+ΣBp) represents a sum of video signals in pixels of a certain region p within one frame.

The divider 6 receives the first addition value (ΣRp+ΣGp) and the second addition value (ΣRp+ΣGp+ΣBp) and calculates a division value {(ΣRp+ΣGp)/(ΣRp+ΣGp+ΣBp)} obtained by dividing the first addition value (ΣRp+ΣGp) by the second addition value (ΣRp+ΣGp+ΣBp).

The coefficient calculator 7 receives the division value {(ΣRp+ΣGp)/(ΣRp+ΣGp+ΣBp)} and compares it with a specified value C. Here, the specified value C is a numerical value exceeding zero and less than one, and serves as an index value for judging whether or not video images for one frame include only blue light at a high ratio. The specified value C may be a value different from the specified values C in the first to third preferred embodiments.

In a case where Expression (11) below is satisfied, that is, in a case where the ratio of the blue signal sum ΣBp to the sum (ΣRp+ΣGp+ΣBp) of video signals in pixels of the region p is equal to or larger than the specified value C, the coefficient calculator 7 outputs a numerical value K1 as a coefficient K.

$$(\Sigma Rp+\Sigma Gp)/(\Sigma Rp+\Sigma Gp+\Sigma Bp)<C \quad (11)$$

In a case where Expression (12) below is satisfied, that is, in a case where the ratio of the blue signal sum ΣBp to the sum (ΣRp+ΣGp+ΣBp) of video signals in pixels of the region p is smaller than the specified value C, the coefficient calculator 7 outputs a numerical value K2 as the coefficient K.

$$(\Sigma Rp+\Sigma Gp)/(\Sigma Rp+\Sigma Gp+\Sigma Bp)\geq C \quad (12)$$

The sum calculators 1 to 3, the adders 4 and 5, and the divider 6 repeat the above-mentioned process on a region 1 to a region N of projected video images for one frame N times, and when even one coefficient K is equal to K1 in regions within the same frame, the coefficient calculator 7 holds a value of K1 as K and outputs that value. When the process is switched to the next frame, the coefficient calculator 7 resets the value of the coefficient K.

Figures 7, 8:
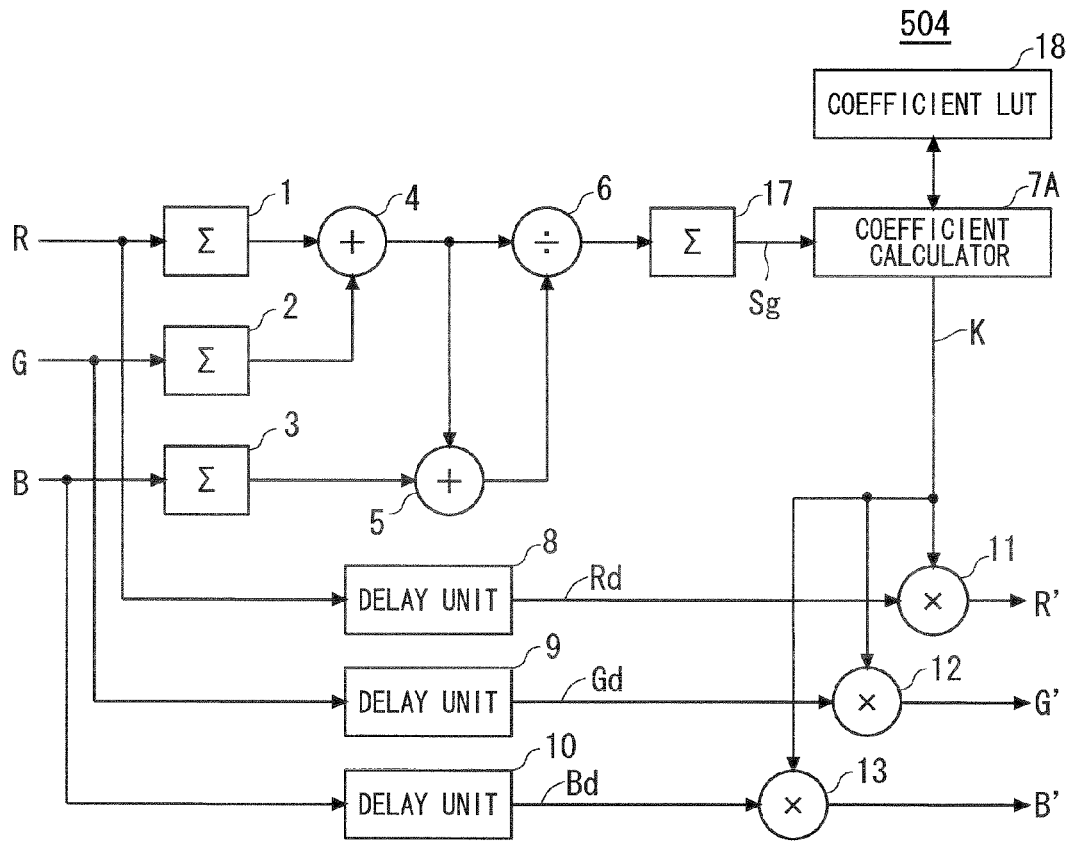
FIG. 7 is a diagram describing the operation of the projector according to the fifth preferred embodiment of the present invention.
FIG. 8 is a block diagram showing the configuration of a blue light effect alleviating part of the projector according to the eighth preferred embodiment of the present invention.

Here, FIG. 7 shows an example in which projected video images for one frame are divided into 16 regions, four regions horizontally and four regions vertically, in total. In FIG. 7, the first line in the horizontal direction includes a region (1, 1), region (2, 1), a region (3, 1), and a region (4, 1), the second line in the horizontal direction includes a region (1, 2), a region (2, 2), a region (3, 2), and a region (4, 2), the third line in the horizontal direction includes a region (1, 3), a region (2, 3), a region (3, 3), and a region (4, 3), and the fourth line in the horizontal direction includes a region (1, 4) a region (2, 4), a region (3, 4), and a region (4, 4). The coefficient calculator 7 performs the judgments of Expressions (11) and (12) on the region (1, 1) to the region (4, 4) in the stated order.

FIG. 7 shows an example in which only the region (3, 2) includes a pixel region BR having only a high ratio of blue light. Expression (12) applies to the regions (the ratio of blue light is low) up to the region (2, 2), and accordingly, K2 is held by the coefficient calculator 7 as the coefficient K. Thereafter, K1 is held as the coefficient K as a result of the process in the region (3, 2), and then, K1 is held until the end of the process in the final region (4, 4) of the frame, which is output from the coefficient calculator 7.

Although the blue light is locally concentrated in the projected video image, in a case where the ratio thereof in the whole of the projected video image is sufficiently small, the blue light effect alleviating parts according to the first to third preferred embodiments judge the ratio of blue light to the whole of the video images for one frame. Therefore, effects on retinas of a user are judged to be low, but in a case where a user gazes at a spot on which only blue light is projected in a concentrated manner, retinas of the user may be affected.

On the other hand, the projector according to the fifth preferred embodiment divides projected video images for one frame into N regions and judges the ratio of blue light per divided region. Accordingly, control to reduce the brightness of a projected video image is performed even in a case where the ratio of blue light is high in a certain divided region, which enables to protect retinas of a user.

<Sixth Preferred Embodiment>

In the first to fourth preferred embodiments described above, the sum calculators 1 to 3 are configured to receive the red signal R, the green signal G, and the blue signal B, respectively, each of which calculates a sum of signals of each color in all pixels (all pixels of the liquid crystal panel 31) of video signals for one frame. In the fifth preferred embodiment, the sum calculators 1 to 3 are each configured to calculate a sum of signals of each color in all of a plurality of pixels forming a certain region obtained in a case where projected video images for one frame are divided into N pieces. Meanwhile, a projector according to a sixth preferred embodiment is characterized in that a sum is not calculated for all pixels but a sum is calculated for pixels thinned out at predetermined pixel intervals.

For example, in a projector in which the liquid crystal panel 31 (FIG. 1) is composed of 480,000 pixels, 800 pixels horizontally and 600 pixels vertically, in total, it is required to perform 480,000 additions by each of the sum calculators 1 to 3 in a period of one frame. For this reason, an amount of computing per unit time increases along with an increase of the number of pixels in a liquid crystal panel.

On the other hand, if the pixels in which signals are input to the sum calculators 1 to 3 are arranged at 5-pixel intervals horizontally as well as vertically, the sum calculators 1 to 3 perform 19,200 (160×120) additions, which enables to reduce the amount of computing to ⅟25.

The above similarly holds true for a case in which projected video images for one frame are divided into N pieces and a sum is calculated per divided region as in the fifth preferred embodiment, and pixels in which signals are input to the sum calculators 1 to 3 in one region may be set at intervals of, for example, 5 pixels.

It is possible to more accurately calculate the ratio of blue light appearing on a projected video image with the use of sum values obtained by calculating sums of signals of respective colors, red, green, and blue in all pixels of video images for one frame. However, an amount of computing increases along with an increase of the number of pixels for one frame, which requires a processor having a high processing speed for the process in real time. On the other hand, in a case of a video image including many natural images, such as video footage, color signals of red, green, and blue in adjacent pixels are similar to each other in many cases, and false detection occurs less frequently even if pixels used for computation are thinned out to same extent, which enables to reduce an amount of computing as well. In a video image including many natural images, such as video footage, the number of pixels in which color signals are similar to each other increases along with higher definition. Therefore, thinning-out interval can be increased, which enables to reduce an amount of computing considerably.

As a result, high speed is not required for the processor for computation process in the blue light effect alleviating part, which enables to reduce a device cost.

<Seventh Preferred Embodiment>

In the sixth preferred embodiment described above, the sum calculators 1 to 3 are configured to calculate sums of red signals, green signals, and blue signals for pixels thinned out at predetermined pixel intervals. Therefore, if the pixel interval is an M-pixel interval, the red signal, the green signal, and the blue signal are used for the pixels including the first pixel, (M+1)th pixel, (2M+1)th pixel, (3M+1)th pixel, . . . . In this case, pixels for which sums are calculated are the same in all frames.

A projector according to a seventh preferred embodiment is characterized in that pixels, for which sums are calculated, are changed for each frame.

That is, the pixels for which sums are calculated can be changed for each frame by changing a position of a pixel in which signals are captured (added) first in each frame. For example, in a case where the pixels in which signals are captured by the sum calculators 1 to 3 are arranged at intervals of 5 pixels, addition targets are color signals in the first, sixth, eleventh, sixteenth, and . . . pixels in the first frame, are second, seventh, twelfth, seventeenth, and . . . pixels in the second frame, are third, eighth, thirteenth, eighteenth, and . . . pixels in the third frame, are fourth, ninth, fourteenth, nineteenth, and . . . pixels in the fourth frame, are fifth, tenth, fifteenth, twentieth, and . . . pixels in the fifth frame, and are the first, sixth, eleventh, sixteenth, and . . . pixels in the sixth frame.

In a case where there are many static images, such as video signals from a personal computer, it is highly likely that the ratio of blue light is falsely detected if sums of color signals of red, green, and blue are calculated in only thinned-out pixels at specific positions. However, by calculating sums by displacing the positions for thinning out pixels little by little for each frame, it is possible to reduce a possibility that a ratio of blue light is falsely detected even in a case of a static image.

The description has been given of the example in which the addition targets in the sixth frame are the same pixels as those in the first frame, and the addition targets are the same pixels at 5-frame intervals, which is not limited thereto.

<Eighth Preferred Embodiment>

FIG. 8 is a block diagram showing the configuration of a blue light effect alleviating part 504 of a projector according to an eighth preferred embodiment of the present invention, where like reference numerals denote similar elements to those of the blue light effect alleviating part 501 shown in FIG. 2, and overlapping description is not given here. The blue light effect alleviating part 504 is included in the video signal processing part 50 shown in FIG. 1.

As shown in FIG. 8, the blue light effect alleviating part 504 mainly includes the sum calculators 1, 2, and 3, a sum calculator 17, the adders 4 and 5, the divider 6, a coefficient calculator 7A, the delay units 8, 9, and 10, the multiplier 11, 12, and 13, and a coefficient look-up table (LUT) 18 (coefficient storage unit).

The blue light effect alleviating part 504 converts the red signal R, green signal G, and blue signal B before being input to a display device into the processed red signal R', processed green signal G', and processed blue signal B' in which effects of blue light on retinas are alleviated. The conversion method is described with reference to FIG. 8.

The sum calculators 1 to 3 receive the red signal R, the green signal G, and the blue signal B, and calculate the red signal sum $\Sigma R$, the green signal sum $\Sigma G$, and the blue signal sum $\Sigma B$ in all pixels (all pixels of the liquid crystal panel 31) of video signals for one frame, respectively.

The adder 4 receives the red signal sum $\Sigma R$ and the green signal sum $\Sigma G$ and calculates a first addition value ($\Sigma R+\Sigma G$).

The adder 5 receives the blue signal sum $\Sigma B$ and the first addition value ($\Sigma R+\Sigma G$) and calculates a second addition value ($\Sigma R+\Sigma G+\Sigma B$). The second addition value ($\Sigma R+\Sigma G+\Sigma B$) represents a sum of video signals for one frame.

The divider 6 receives the first addition value ($\Sigma R+\Sigma G$) and the second addition value ($\Sigma R+\Sigma G+\Sigma B$) and calculates a division value $\{(\Sigma R+\Sigma G)/(\Sigma R+\Sigma G+\Sigma B)\}$ obtained by dividing the first addition value ($\Sigma R+\Sigma G$) by the second addition value ($\Sigma R+\Sigma G+\Sigma B$). The sum calculator 17 is provided with the outputs of the divider 6 and calculates a sum thereof.

Here, if an output value of the divider 6 in the i-th frame is represented by $\{(\Sigma Ri+\Sigma Gi)/(\Sigma Ri+\Sigma Gi+\Sigma Bi)\}$, a sum Sg of output values of the divider 6 up to the F-th frame is expressed by Expression (13) below.

$$Sg = \sum_{i=1\sim F} \left\{ \frac{(\Sigma Ri + \Sigma Gi)}{(\Sigma Ri + \Sigma Gi + \Sigma Bi)} \right\} \qquad (13)$$

The sum calculator 17 serves to dynamically sum the output values of the divider 6 for frames up to the immediately preceding F-th frame, and accordingly, the sum Sg in the (F+1)th frame is expressed by Expression (14) below.

$$Sg = \sum_{i=2\sim F+1} \left\{ \frac{(\Sigma Ri + \Sigma Gi)}{(\Sigma Ri + \Sigma Gi + \Sigma Bi)} \right\} \qquad (14)$$

Similarly, the sum Sg in the (F+X)th frame is expressed by Expression (15) below.

$$Sg = \sum_{i=1+X\sim F+X} \left\{ \frac{(\Sigma Ri + \Sigma Gi)}{(\Sigma Ri + \Sigma Gi + \Sigma Bi)} \right\} \qquad (15)$$

The coefficient calculator 7A receives the sum Sg of the output values of the divider 6 described above, compares the sum Sg with the specified value C, reads a coefficient K stored in the coefficient LUT 18 based on the comparison results, and outputs the coefficient K.

The coefficient LUT 18 stores coefficients K that gradually increase from a specific value exceeding zero and less than one to one.

For example, description is given of a case in which six coefficients K, that is, 0.5, 0.6, 0.7, 0.8, 0.9, and 1.0 are stored in the coefficient LUT 18. The coefficient calculator 7A receives the sum Sg obtained from the sum calculator 17 and compares the sum Sg with the specified value C. Here, the specified value C is a numerical value exceeding zero but not exceeding F, which serves as an index value for judging whether or not video images for a plurality of frames include only blue light at a high ratio. The coefficient calculator 7A changes the coefficient read from the coefficient LUT 18 between a case in which Expression (16) below is satisfied and a case in which Expression (17) below is satisfied.

$$Sg<C \qquad (16)$$

$$Sg\geq C \qquad (17)$$

In the coefficient calculator 7A, in a case where an initialization value of the coefficient K from the coefficient LUT 18 is, for example, 1.0, and in a case where Expression (16) above is satisfied, that is, in a case where a ratio of a sum of blue signals to a sum of video signals for a plurality of frames is equal to or larger than the specified value C, the coefficient calculator 7A reads a value 0.9 that is smaller than the initialization value by one notch from the coefficient LUT 18, and outputs 0.9 as the coefficient K. A video image is dark in a case where the coefficient K is smaller than one, and accordingly, the initialization value is set to one.

In a case where Expression (16) is also satisfied as to a value obtained by calculating a sum of output values of the divider 6 for the next frame, the coefficient calculator 7A reads a value 0.8 further smaller by one notch from the coefficient LUT 18, and outputs the value 0.8 as the coefficient K. As long as Expression (16) is satisfied in this manner, values read from the coefficient LUT 18 are decreased one after another by one notch. Then, once the value reaches the minimum value 0.5, the minimum value 0.5 is kept as the coefficient K as long as Expression (16) is satisfied.

Meanwhile, in a case where Expression (17) is satisfied as to a value obtained by calculating a sum of output values of the divider 6 for a frame, that is, in a case where a ratio of the sum of blue signals to the sum of video signals in a plurality of frames is smaller than the specified value C, values read from the coefficient LUT 18 are increased by one notch. For example, in a case where the minimum value 0.5 is kept as the coefficient K, the next value 0.6 is read and output as the coefficient K. Then, as long as Expression (17) is satisfied, values read from the coefficient LUT 18 are increased by one notch. Then, once the value reaches the maximum value 1.0, the maximum value 1.0 is kept as the coefficient K as long as Expression (17) is satisfied.

The coefficient K expressed by Expression (6) is a value stored in the coefficient LUT 18 in the eighth preferred embodiment, so that K is from 0.5 to 1.0.

For example, as to a moving image in which video images are switched one after another, in a case where the brightness of a projected video image is reduced by merely judging that only the ratio of blue light is high in one frame, if the ratio of blue light is low in the next frame, the brightness of the projected video image is recovered. As a result of the process as described above, a flicker of a projected video image is visually identified, and the projected video image may appear unnatural.

However, the projector according to the eighth preferred embodiment dynamically calculates a sum of output values of the divider 6 for a plurality of frames. This enables the control to gradually reduce the brightness in a case where the frames having only a high ratio of blue light in a projected video image follow one after another and gradually increase the brightness in a case where the frames having a low ratio of blue light therein follow one after another.

The blue light effect alleviating part 504 (FIG. 8) obtained by adding the sum calculator 17 and the coefficient LUT 18 to the blue light effect alleviating part 501 described with reference to FIG. 2 has been illustrated as a device configuration in the description above, which may be configured by adding the sum calculator 17 and the coefficient LUT 18 to the blue light effect alleviating part 502 described with reference to FIG. 3 or the blue light effect alleviating part 503 described with reference to FIG. 5.

In this preferred embodiment, an excessively large number of frames, for which the sum calculator 17 calculates a sum, causes a delay in a projected video image. Therefore, desirably, the number of frames is approximately 10 to 20 to prevent a situation in which a delay is visually identified.

<Ninth Preferred Embodiment>

Figure 9:
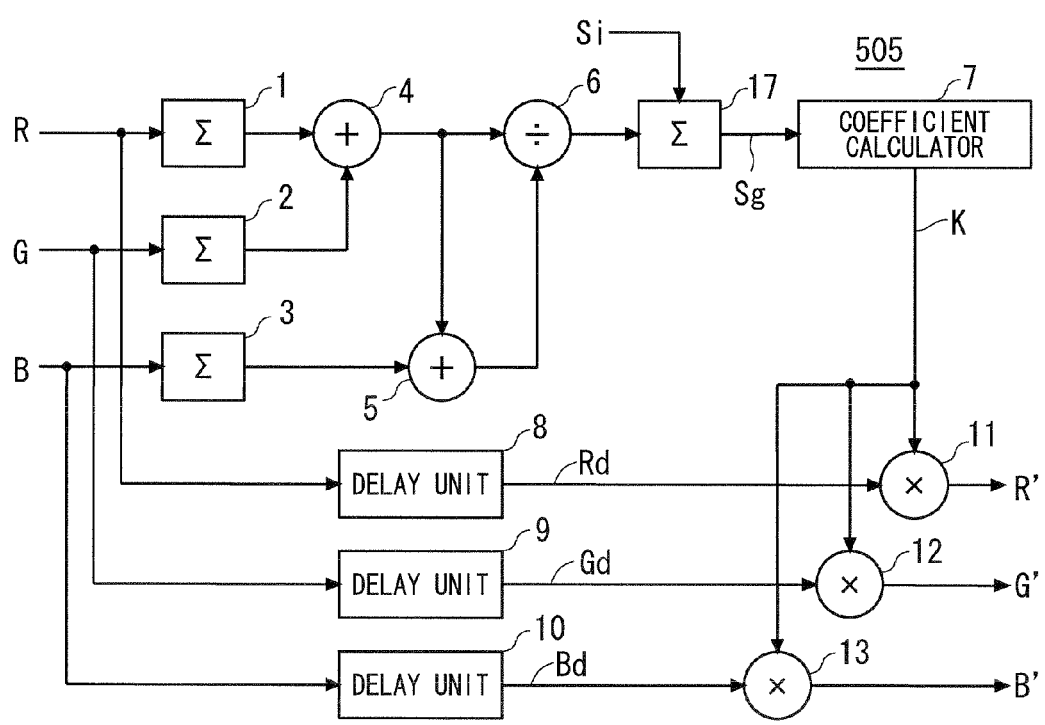
FIG. 9 is a block diagram showing the configuration of a blue light effect alleviating part of the projector according to the ninth preferred embodiment of the present invention.

FIG. 9 is a block diagram showing the configuration of a blue light effect alleviating part 505 of a projector according to a ninth preferred embodiment of the present invention, where like reference numerals denote similar elements to those of the blue light effect alleviating part 501 shown in FIG. 2, and overlapping description is not given here. The blue light effect alleviating part 505 is included in the video signal processing part 50 shown in FIG. 1.

As shown in FIG. 9, the blue light effect alleviating part 505 mainly includes the sum calculators 1, 2, 3, and 17, the adders 4 and 5, the divider 6, the coefficient calculator 7, the delay units 8, 9, and 10, and the multiplier 11, 12, and 13.

The blue light effect alleviating part 505 converts the red signal R, green signal G, and blue signal B before being input to a display device into the processed red signal R', processed green signal G', and processed blue signal B' in which effects of blue light on retinas are alleviated. The conversion method is described with reference to FIG. 9.

The sum calculators 1 to 3 receive the red signal R, the green signal G, and the blue signal B, and calculate the red signal sum $\Sigma R$, the green signal sum $\Sigma G$, and the blue signal sum $\Sigma B$ in all pixels (all pixels of the liquid crystal panel 31) of video signals for one frame, respectively.

The adder 4 receives the red signal sum $\Sigma R$ and the green signal sum $\Sigma G$ and calculates a first addition value ($\Sigma R+\Sigma G$).

The adder 5 receives the blue signal sum $\Sigma B$ and the first addition value ($\Sigma R+\Sigma G$) and calculates a second addition value ($\Sigma R+\Sigma G+\Sigma B$). The second addition value ($\Sigma R+\Sigma G+\Sigma B$) represents a sum of video signals for one frame.

The divider 6 receives the first addition value ($\Sigma R+\Sigma G$) and the second addition value ($\Sigma R+\Sigma G+\Sigma B$) and calculates a division value $\{(\Sigma R+\Sigma G)/(\Sigma R+\Sigma G+\Sigma B)\}$ obtained by dividing the first addition value ($\Sigma R+\Sigma G$) by the second addition value ($\Sigma R+\Sigma G+\Sigma B$). The sum calculator 17 is provided with the outputs of the divider 6 and calculates a sum thereof.

The sum calculator 17 receives a video signal identification signal Si. The video signal identification signal Si is a signal for identifying whether a video signal being processed by the blue light effect alleviating part 505 is a video signal from a personal computer or a video signal from video equipment such as a DVD player. For example, "0" is provided as the video signal identification signal Si in a case where a video signal from a personal computer is input, whereas "1" is provided as Si in a case where a video signal from video equipment is input. The video signal identification signal Si is produced by the video signal processing part 50 (FIG. 1), which receives video signals from a personal computer or video equipment such as a DVD recorder, based on, for example, horizontal and vertical synchronizing signals included in video signals.

The number of frames for which a sum Sg is calculated by the sum calculator 17 is reduced in a case where the video signal identification signal Si is "0", whereas the number of frames for which the sum Sg is calculated by the sum calculator 17 is increased in a case where the video signal identification signal Si is "1".

The sum Sg is obtained by dynamically summing the output values of the divider 6 for frames up to the immediately preceding one. Accordingly, in a case where the number of frames for which a sum is calculated is small, whether only the ratio of blue light is high is determined in projected video images for the small number of frames, which makes the tracking performance for a change of the projected video image fast. On the contrary, in a case where the number of frames for which a sum is calculated is large, whether only the ratio of blue light is high is determined in projected video images for the large number of frames, which makes the tracking performance for a change of the projected video image slow.

In a case of a video signal from a personal computer, static images follow one after another, and then, switching from the immediately preceding video image occurs in many cases. As a result, it is expected that the ratio of blue light in a projected video image will increase abruptly in many cases. Therefore, control in which priority is placed on the speed of tracking is preferred, and the number of frames for which the sum Sg is calculated by the sum calculator 17 is reduced.

On the other hand, in a case of a video signal from video equipment, abrupt switching of projected video images occurs less frequently. As a result, it is expected that an increase in ratio of blue light in a projected video image will occur less frequently. Therefore, control in which priority is placed on natural switching of projected video images is preferred, and the frame number for which the sum Sg is calculated by the sum calculator 17 is increased.

As a result of the control switching as described above, effects on retinas of a user are reduced especially in video projection from a personal computer in which primary colors are heavily used, and besides, the frequency of unnatural switching of brightness when video images are viewed is reduced in video projection from video equipment. This enables to prevent a projected video image from flickering.

The blue light effect alleviating part 505 (FIG. 9) obtained by adding the sum calculator 17 to the blue light effect alleviating part 501 described with reference to FIG. 2 has been illustrated as a device configuration in the description above. Alternatively, the device configuration may be made such that the sum calculator 17 is added to the blue light effect alleviating part 502 described with reference to FIG. 3 or the blue light effect alleviating part 503 described with reference to FIG. 5, to thereby adjust the number of frames for which the sum is calculated by the video signal identification signal Si. Still alternatively, the device configuration may be made such that the number of frames for which the sum is calculated is adjusted by the video signal identification signal Si in the blue light effect alleviating part 504 described with reference to FIG. 8.

<Tenth Preferred Embodiment>

FIG. 10 is a block diagram showing the configuration of a blue light effect alleviating part 506 of a projector according to a tenth preferred embodiment of the present invention, where like reference numerals denote similar elements to those of the blue light effect alleviating part 501 shown in FIG. 2, and overlapping description is not given here. The blue light effect alleviating part 506 is included in the video signal processing part 50 shown in FIG. 1.

As shown in FIG. 10, the blue light effect alleviating part 506 mainly includes the sum calculators 1, 2, and 3, the adders 4 and 5, the divider 6, a coefficient calculator 7B, the delay units 8, 9, and 10, and the multipliers 11, 12, and 13.

Also, the blue light effect alleviating part 506 is configured to obtain a numerical value S' corresponding to an area of a projected video image after being zoomed with the use of a range finder 19, a zoom lens rotational position detector 20, and a projected video image area estimator 21 included in the projector, and to set a coefficient K by the coefficient calculator 7B based on the numerical value S'.

The range finder 19 includes a sensor that measures a distance using, for example, infrared rays, laser, or ultrasonic waves, which measures the distance between the projector and the screen 90 (FIG. 1), and inputs a numerical value d corresponding to the distance to the projected video image area estimator 21.

The zoom lens rotational position detector 20 outputs a numerical value z corresponding to a rotational position of a zoom lens included in the projection optical system 40 (FIG. 1).

The size of a projected video image on the screen 90 can be changed by moving the zoom lens, where a ratio of the magnitude of the opposite angle of a projected video image between before and after the zoom lens is moved (zoom ratio of a projected video image) r is determined by an optical position of the zoom lens. The optical position of the zoom lens is determined by the rotational position z of the zoom lens, and accordingly, the zoom ratio r of the projected video image is determined by a function f as expressed by Expression (18) below.

$$r=f(z) \quad (18)$$

The function f is uniquely determined by the projection optical system 40 of the projector.

An area S of the projected video image is determined by a distance d between the projector and the screen 90 and the optical position of the zoom lens (rotational position z of the zoom lens), which is determined by a function g expressed by Expression (19) below.

$$S=g(d,z) \quad (19)$$

The function g is uniquely determined by the projection optical system 40 of the projector.

The area of the projected video image after being zoomed is proportional to the square of the ratio of the opposite angle of a projected image between before and after being zoomed (zoom ratio of a projected video image), and thus, an area S' of a projected video image after being zoomed is calculated by Expression (20) below.

$$S'=S \times r^2 = g(d,z) \times \{f(z)\}^2 \quad (20)$$

The projected video image area estimator 21 receives the numerical value d corresponding to the distance between the projector and the screen 90, which is output from the range finder 19, and the rotational position z of the zoom lens, which is output from the zoom lens rotational position detector 20, performs a computation based on the function f and function g uniquely determined by the projection optical system 40 of the projector, and outputs the numerical value S' corresponding to the area of the projected video image after being zoomed. The area S of the projected video image before being zoomed may be fixed to a value in a case where the rotational position of the zoom lens is minimized or maximized.

The illuminance of a projected video image changes in proportion to the area of the projected video image. Accordingly, if the distance between the projector and the screen 90 becomes larger or the zoom ratio of the projected video image becomes larger than one (is scaled up) so that the area of the projected video image becomes larger, retinas of a user are less likely to be affected by blue light. On the contrary, if the distance between the projector and the screen 90 becomes smaller or the zoom ratio of a projected video image becomes smaller than one (is scaled down) so that the area of the projected video image becomes smaller, retinas of a user are more likely to be affected by blue light.

The coefficient calculator 7B outputs a coefficient K variable in the numerical value range exceeding zero and equal to or smaller than one, in accordance with the size of the area S' of the projected video image after being zoomed. For example, in light of specifications of a product, the coefficient K is minimized in a case where the area S' of the projected video image after being zoomed is minimized. Meanwhile, the coefficient K is set to one (maximum value) in a case where the area S' of the projected video image after being zoomed has a size equal to or larger than a certain size (area of a projected video image having the illuminance that is regarded safe even when a projected video image includes only blue light).

The coefficient K between a minimum value and a maximum value may be determined in proportion to (through linear transformation into) the size of the area S' of a projected video image after being zoomed, or may be determined through non-linear transformation between a minimum value and a maximum value.

In a case where the distance between the projector and the screen 90 is small and a projected video image is small (a projected video image is bright), retinas of a user are affected largely even if the ratio of blue light in the projected video image is low. However, control to reduce the brightness of the projected video image is made by the coefficient K set as described above, which enables to protect the retinas of a user.

The description has been given assuming that the projected video image area estimator 21 performs a computation based on the function f and the function g. Alternatively, the configuration may be made such that the projected video image area estimator 21 does not have a computing function but includes a look-up table for outputting the area S' of the projected video image after being zoomed with respect to two inputs of the distance d between the projector and the screen 90 and the rotational position z of the zoom lens.

The description has been given of the device configuration in which the coefficient calculator 7 of the blue light effect alleviating part 501 described with reference to FIG. 2 is replaced with the coefficient calculator 7B that sets the variable coefficient K based on the numerical value S' corresponding to the area of the projected video image after being zoomed that is obtained with the use of the range finder 19, the zoom lens rotational position detector 20, and the projected video image area estimator 21. However, the device configuration is not limited to the above, and the device configuration may be made such that the coefficient calculator 7 in the blue light effect alleviating part 502 described with reference to FIG. 3, the blue light effect alleviating part 503 described with reference to FIG. 5, or the blue light effect alleviating part 505 described with reference to FIG. 9 is replaced with the coefficient calculator 7B, or the coefficient calculator 7A in the blue light effect alleviating part 504 described with reference to FIG. 8 is replaced with the coefficient calculator 7B, and the range finder 19, the zoom lens rotational position detector 20, and the projected video image area estimator 21 are added.

<Eleventh Preferred Embodiment>

FIG. 11 is a block diagram showing the configuration of a blue light effect alleviating part 507 of a projector according to an eleventh preferred embodiment of the present invention, where like reference numerals denote similar elements to those of the blue light effect alleviating part 501 shown in FIG. 2, and overlapping description is not given here. The blue light effect alleviating part 507 is included in the video signal processing part 50 shown in FIG. 1.

As shown in FIG. 11, the blue light effect alleviating part 507 mainly includes the sum calculators 1, 2, and 3, the adders 4 and 5, the divider 6, a coefficient calculator 7C, the delay units 8, 9, and 10, and the multipliers 11, 12, and 13.

Also, the blue light effect alleviating part 507 is configured such that the coefficient calculator 7C sets the coefficient K based on the numerical value B corresponding to the illuminance measured by a photometer 22 included in the projector.

The photometer 22 includes a sensor that measures an amount of light, such as an illuminance meter, which measures the illuminance around the projector, outputs the numerical value B corresponding to the illuminance, and inputs the numerical value B to the coefficient calculator 7C.

The coefficient calculator 7C outputs the coefficient K variable in the numerical value range exceeding zero and equal to or smaller than one, in accordance with the magnitude of the illuminance B.

For example, in a case where the illuminance B is equal to or larger than a certain value (illuminance at which the surroundings of the projector are regarded as being sufficiently bright), the coefficient K is set to one (maximum value). Meanwhile, in a case where the illuminance B is equal to or smaller than a certain value (illuminance at which the surroundings of the projector are regarded as being sufficiently dark), the coefficient K is set to a minimum value. The coefficient K between the minimum value and the maximum value may be determined in proportion to (through linear transformation into) the magnitude of the illuminance B or may be determined through non-linear transformation between the minimum value and the maximum value.

In a case where the projector is used in a dark place, a user is highly likely to view a projected video image in the state in which the pupils open, and thus, retinas of the user are affected largely even if a ratio of blue light in the projected video image is relatively small. On the contrary, in a case where the projector is used in a bright place, the pupils of a user partially open, and thus, retinas of the user are less affected even if a ratio of blue light in the projected video image is relatively high.

Control is made such that, with the use of the coefficient K set as described above, the brightness of a projected video image is increased in a case where the surroundings of the projector are bright and the brightness of a projected video image is reduced in a case where the surroundings of the projector are dark, which enables to protect retinas of a user.

The description has been given of the device configuration in which the coefficient calculator 7 of the blue light effect alleviating part 501 described with reference to FIG. 2 is replaced with the coefficient calculator 7C that sets the variable coefficient K based on the numerical value B corresponding to the illuminance obtained with the use of the photometer 22. However, the device configuration is not limited thereto, and the configuration may be made such that the coefficient calculator 7 in the blue light effect alleviating part 502 described with reference to FIG. 3, the blue light effect alleviating part 503 described with reference to FIG. 5, or the blue light effect alleviating part 505 described with reference to FIG. 9 is replaced with the coefficient calculator 7C, or the coefficient calculator 7A in the blue light effect alleviating part 504 described with reference to FIG. 8 is replaced with the coefficient calculator 7C.

The preferred embodiments of the present invention can be appropriately combined with each other, modified, or omitted within the scope of the invention.

What is claimed is:

1. A projector, comprising: a light modulation part modulating light generated by a light source part; a video signal processing part processing a video signal to be input; and a projection optical system projecting the light modulated by said light modulation part onto an external projection target to obtain a projected video image, wherein said video signal processing part includes a blue light effect alleviating part alleviating effects of blue light on retinas, and in a case where only a ratio of a blue signal included in the video signal is high, said blue light effect alleviating part performs control to reduce the brightness of said projected video image as a whole by reducing signal values of said blue signal, a green signal, and a red signal, wherein said blue light effect alleviating part includes:
- first, second, and third sum calculators calculating a sum of said red signals, a sum of said green signals, and a sum of said blue signals in individual pixels of video signals for one frame, respectively;
- a first adder adding output values of said first sum calculator and said second sum calculator;
- a second adder adding an output value of said first adder and an output value of said third sum calculator;
- a divider dividing the output value of said first adder by an output value of said second adder;
- a coefficient calculator outputting a first coefficient in a case where an output value of said divider is smaller than a specified value and outputting a second coefficient larger than said first coefficient in a case where the output value of said divider is equal to or larger than said specified value;
- first, second, and third delay units outputting said red signal, said green signal, and said blue signal as a red delay signal, a green delay signal, and a blue delay signal, respectively, with delays for predetermined periods; and
- first, second, and third multipliers respectively multiplying said red delay signal, said green delay signal, and said blue delay signal by said first or second coefficient.

2. The projector according to claim 1, wherein
said first, second, and third sum calculators calculate a sum of said red signals, a sum of said green signals, and a sum of said blue signals in individual pixels forming each region obtained in a case where said projected video images for one frame are divided into a plurality of regions, per region,
said coefficient calculator outputs said first coefficient in a case where the output value of said divider in any of the regions is smaller than said specified value and outputs said second coefficient in a case where the output value of said divider is equal to or larger than said specified value, and
said coefficient calculator multiplies said red delay signal, said green delay signal, and said blue delay signal by said first coefficient in a case where said first coefficient is output in any one of said plurality of regions.

3. The projector according to claim 1, wherein said first, second, and third sum calculators each calculate a sum for pixels thinned out at predetermined pixel intervals from said individual pixels of said video signals for one frame.

4. The projector according to claim 3, wherein said first, second, and third sum calculators change, for each frame, pixels for which sums are calculated by changing, for each frame, a position of a pixel in which signals are captured first among said individual pixels of said video signals for one frame.

5. The projector according to claim 1, further comprising:
- a fourth sum calculator provided between said divider and said coefficient calculator and calculating a sum of output values of said divider for a predetermined number of frames; and
- a coefficient storage unit storing coefficients that gradually increase from a specific value exceeding zero and less than one to one, wherein
said coefficient calculator reads a coefficient smaller than a current value by one notch from said coefficient storage unit and takes the read value as said first coefficient in a case where an output value of said fourth sum calculator is smaller than said specified value; and
said coefficient calculator reads a coefficient larger than the current value by one notch from said coefficient storage unit and takes the read value as said second coefficient in a case where the output value of said fourth sum calculator is equal to or larger than said specified value.

6. The projector according to claim 5, wherein said fourth sum calculator sets said predetermined number of frames based on whether said video signal is a video signal from a personal computer or a video signal from video equipment.

7. The projector according to claim 1, further comprising:
- a range finder measuring a distance to said projection target;
- a rotational position detector detecting a rotational position of a zoom lens included in said projection optical system; and
- a projected video image area estimator receiving said distance and said rotational position of said zoom lens, and calculating and outputting an estimated area of said projected video image,
wherein said coefficient calculator varies said first coefficient and said second coefficient based on said estimated area and outputs said varied first and second coefficients.

8. The projector according to claim 1, further comprising a photometer measuring the ambient brightness and outputting the illuminance thereof,
wherein said coefficient calculator varies said first coefficient and said second coefficient based on said illuminance and outputs the varied first and second coefficients.

9. A projector, comprising: a light modulation part modulating light generated by a light source part; a video signal processing part processing a video signal to be input; and a projection optical system projecting the light modulated by said light modulation part onto an external projection target to obtain a projected video image, wherein said video signal processing part includes a blue light effect alleviating part alleviating effects of blue light on retinas, and in a case where only a ratio of a blue signal included in the video signal is high, said blue light effect alleviating part performs control to reduce the brightness of said projected video image as a whole by reducing signal values of said blue signal, a green signal, and a red signal, wherein said blue light effect alleviating part includes:
- first, second, and third sum calculators calculating a sum of said red signals, said green signals, and said blue signals in individual pixels of video signals for one frame;
- fourth, fifth, and sixth multipliers multiplying output values of said first, second, and third sum calculators by values obtained by subtracting, as coefficients, a relative luminous efficiency at a wavelength of red light, a relative luminous efficiency at a wavelength of green light, and a relative luminous efficiency at a wavelength of blue light corresponding to three primary colors of light, respectively, from one;
- a first adder adding output values of said fourth multiplier and said fifth multiplier;
- a second adder adding an output value of said first adder and an output value of said sixth multiplier;
- a divider dividing the output value of said first adder by an output value of said second adder;
- a coefficient calculator outputting a first coefficient in a case where an output value of said divider is smaller than a specified value and outputting a second coefficient larger than said first coefficient in a case where the output value of said divider is equal to or larger than said specified value;

first, second, and third delay units outputting said red signal, said green signal, and said blue signal as a red delay signal, a green delay signal, and a blue delay signal, respectively, with delays of predetermined periods; and first, second, and third multipliers respectively multiplying said red delay signal, said green delay signal, and said blue delay signal by said first or second coefficient.

10. The projector according to claim 9, wherein said light source part generates light having a constant wavelength range, and said video signal processing part multiplies relative energy at each wavelength within a wavelength range having a spectral distribution of light of each color by the relative luminous efficiency at each wavelength, and determines the relative luminous efficiency at the wavelength of said red light, the relative luminous efficiency at the wavelength of said green light, and the relative luminous efficiency at the wavelength of said blue light, with a wavelength having the largest multiplication value as a representative wavelength.

11. The projector according to claim 9, wherein said first, second, and third sum calculators calculate a sum of said red signals, a sum of said green signals, and a sum of said blue signals in individual pixels forming each region obtained in a case where said projected video images for one frame are divided into a plurality of regions, per region, said coefficient calculator outputs said first coefficient in a case where the output value of said divider in any of the regions is smaller than said specified value and outputs said second coefficient in a case where the output value of said divider is equal to or larger than said specified value, and said coefficient calculator multiplies said red delay signal, said green delay signal, and said blue delay signal by said first coefficient in a case where said first coefficient is output in any one of said plurality of regions.

12. The projector according to claim 9, wherein said first, second, and third sum calculators each calculate a sum for pixels thinned out at predetermined pixel intervals from said individual pixels of said video signals for one frame.

13. The projector according to claim 12, wherein said first, second, and third sum calculators change, for each frame, pixels for which sums are calculated by changing, for each frame, a position of a pixel in which signals are captured first among said individual pixels of said video signals for one frame.

14. The projector according to claim 9, further comprising:

a fourth sum calculator provided between said divider and said coefficient calculator and calculating a sum of output values of said divider for a predetermined number of frames; and a coefficient storage unit storing coefficients that gradually increase from a specific value exceeding zero and less than one to one, wherein said coefficient calculator reads a coefficient smaller than a current value by one notch from said coefficient storage unit and takes the read value as said first coefficient in a case where an output value of said fourth sum calculator is smaller than said specified value; and said coefficient calculator reads a coefficient larger than the current value by one notch from said coefficient storage unit and takes the read value as said second coefficient in a case where the output value of said fourth sum calculator is equal to or larger than said specified value.

15. The projector according to claim 14, wherein said fourth sum calculator sets said predetermined number of frames based on whether said video signal is a video signal from a personal computer or a video signal from video equipment.

16. The projector according to claim 9, further comprising:

a range finder measuring a distance to said projection target;

a rotational position detector detecting a rotational position of a zoom lens included in said projection optical system; and a projected video image area estimator receiving said distance and said rotational position of said zoom lens, and calculating and outputting an estimated area of said projected video image, wherein said coefficient calculator varies said first coefficient and said second coefficient based on said estimated area and outputs said varied first and second coefficients.

17. The projector according to claim 9, further comprising a photometer measuring the ambient brightness and outputting the illuminance thereof, wherein said coefficient calculator varies said first coefficient and said second coefficient based on said illuminance and outputs the varied first and second coefficients.

18. A projector, comprising: a light modulation part modulating light generated by a light source part; a video signal processing part processing a video signal to be input; and a projection optical system projecting the light modulated by said light modulation part onto an external projection target to obtain a projected video image, wherein said video signal processing part includes a blue light effect alleviating part alleviating effects of blue light on retinas, and in a case where only a ratio of a blue signal included in the video signal is high, said blue light effect alleviating part performs control to reduce the brightness of said projected video image as a whole by reducing signal values of said blue signal, a green signal, and a red signal, wherein said blue light effect alleviating part includes:

first, second, and third sum calculators calculating a sum of said red signal, said green signal, and said blue signal in individual pixels of the video signal for one frame;

fourth, fifth, and sixth multipliers multiplying output values of said first, second, and third sum calculators by, as coefficients, a reciprocal of a relative luminous efficiency at a wavelength of red light, a reciprocal of a relative luminous efficiency at a wavelength of green light, and a reciprocal of a relative luminous efficiency at a wavelength of blue light corresponding to three primary colors of light, respectively;

a first adder adding output values of said fourth multiplier and said fifth multiplier;

a second adder adding an output value of said first adder and an output value of said sixth multiplier;

a divider dividing the output value of said first adder by an output value of said second adder;

a coefficient calculator outputting a first coefficient in a case where an output value of said divider is smaller than a specified value and outputting a second coefficient larger than said first coefficient in a case where the output value of said divider is equal to or larger than said specified value;

first, second, and third delay units outputting said red signal, said green signal, and said blue signal as a red delay signal, a green delay signal, and a blue delay signal, respectively, with delays of predetermined periods; and first, second, and third multipliers respectively multiplying said red delay signal, said green delay signal, and said blue delay signal by said first or second coefficient.

19. The projector according to claim 18, wherein
said light source part generates light having a constant wavelength range, and
said video signal processing part multiplies relative energy at each wavelength within a wavelength range having a spectral distribution of light of each color by the relative luminous efficiency at each wavelength, and determines the relative luminous efficiency at the wavelength of said red light, the relative luminous efficiency at the wavelength of said green light, and the relative luminous efficiency at the wavelength of said blue light, with a wavelength having the largest multiplication value as a representative wavelength.

20. The projector according to claim 18, wherein
said first, second, and third sum calculators calculate a sum of said red signals, a sum of said green signals, and a sum of said blue signals in individual pixels forming each region obtained in a case where said projected video images for one frame are divided into a plurality of regions, per region,
said coefficient calculator outputs said first coefficient in a case where the output value of said divider in any of the regions is smaller than said specified value and outputs said second coefficient in a case where the output value of said divider is equal to or larger than said specified value, and
said coefficient calculator multiplies said red delay signal, said green delay signal, and said blue delay signal by said first coefficient in a case where said first coefficient is output in any one of said plurality of regions.

21. The projector according to claim 18, wherein said first, second, and third sum calculators each calculate a sum for pixels thinned out at predetermined pixel intervals from said individual pixels of said video signals for one frame.

22. The projector according to claim 21, wherein said first, second, and third sum calculators change, for each frame, pixels for which sums are calculated by changing, for each frame, a position of a pixel in which signals are captured first among said individual pixels of said video signals for one frame.

23. The projector according to claim 18, further comprising:
a fourth sum calculator provided between said divider and said coefficient calculator and calculating a sum of output values of said divider for a predetermined number of frames; and
a coefficient storage unit storing coefficients that gradually increase from a specific value exceeding zero and less than one to one, wherein
said coefficient calculator reads a coefficient smaller than a current value by one notch from said coefficient storage unit and takes the read value as said first coefficient in a case where an output value of said fourth sum calculator is smaller than said specified value; and
said coefficient calculator reads a coefficient larger than the current value by one notch from said coefficient storage unit and takes the read value as said second coefficient in a case where the output value of said fourth sum calculator is equal to or larger than said specified value.

24. The projector according to claim 23, wherein said fourth sum calculator sets said predetermined number of frames based on whether said video signal is a video signal from a personal computer or a video signal from video equipment.

25. The projector according to claim 18, further comprising:
a range finder measuring a distance to said projection target;
a rotational position detector detecting a rotational position of a zoom lens included in said projection optical system; and
a projected video image area estimator receiving said distance and said rotational position of said zoom lens, and calculating and outputting an estimated area of said projected video image,
wherein said coefficient calculator varies said first coefficient and said second coefficient based on said estimated area and outputs said varied first and second coefficients.

26. The projector according to claim 18, further comprising a photometer measuring the ambient brightness and outputting the illuminance thereof,
wherein said coefficient calculator varies said first coefficient and said second coefficient based on said illuminance and outputs the varied first and second coefficients.

* * * * *